US008649681B2

(12) United States Patent
Öhlén

(10) Patent No.: US 8,649,681 B2
(45) Date of Patent: Feb. 11, 2014

(54) METHODS AND DEVICES FOR WAVELENGTH ALIGNMENT IN WDM-PON

(75) Inventor: Peter Öhlén, Stockholm (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 104 days.

(21) Appl. No.: 13/129,741

(22) PCT Filed: Nov. 30, 2009

(86) PCT No.: PCT/SE2009/051357
§ 371 (c)(1),
(2), (4) Date: May 17, 2011

(87) PCT Pub. No.: WO2010/064981
PCT Pub. Date: Jun. 10, 2010

(65) Prior Publication Data
US 2011/0236017 A1    Sep. 29, 2011

Related U.S. Application Data

(60) Provisional application No. 61/118,873, filed on Dec. 1, 2008.

(51) Int. Cl.
*H04J 14/00* (2006.01)
*H04B 10/00* (2013.01)
(52) U.S. Cl.
USPC ................................ 398/72; 398/69; 398/156
(58) Field of Classification Search
None
See application file for complete search history.

(56) References Cited

U.S. PATENT DOCUMENTS 6,567,198 B1 * 5/2003 Kang ............................... 398/91
2003/0053176 A1 * 3/2003 Nishigaki et al. ............. 359/168
(Continued)

FOREIGN PATENT DOCUMENTS

JP   2006-197489   7/2006
JP   2008-172717   7/2008

OTHER PUBLICATIONS

Suzuki et al. *Demonstration and Performance of Colorless ONU for Coexistence-Type WDM-PON Using a Wavelength-Tunable L-Band DWDM-SFP Transceiver*, IEEE Photonics Technology Letters, vol. 20, No. 19, Oct. 1, 2008, pp. 1603-1605.

(Continued)

*Primary Examiner* — Leslie Pascal
*Assistant Examiner* — Casey Kretzer
(74) *Attorney, Agent, or Firm* — Myers Bigel Sibley & Sajvoec, P.A.

(57) ABSTRACT

An optical network unit for a passive optical network (10), configured to: initiate an upstream wavelength ($w_{us}$) for an upstream signal (US) from the optical network unit to an optical line terminal (10); iteratively, until an iteration criterion is met, i) transmit the upstream signal (US) to the optical line terminal (10), ii) receive from the optical line terminal (10) power level data (p) for the upstream signal (US) as measured by the optical line terminal (10), and iii) set the upstream wavelength ($w_{us}$) for the upstream signal (US) to a new wavelength-value; and adjust the upstream wavelength ($w_{us}$) to a wavelength-value previously set for the upstream signal (US) and associated with power level data corresponding to a certain power level. A passive optical network system, the optical line terminal and related methods are also disclosed.

21 Claims, 5 Drawing Sheets

(56) References Cited

U.S. PATENT DOCUMENTS

| | | | |
|---|---|---|---|
| 2005/0047783 A1* | 3/2005 | Sisto et al. | 398/71 |
| 2006/0147211 A1 | 7/2006 | Kim et al. | |
| 2007/0154216 A1* | 7/2007 | Kim et al. | 398/71 |
| 2007/0264020 A1 | 11/2007 | Li et al. | |
| 2008/0089699 A1* | 4/2008 | Li et al. | 398/197 |
| 2008/0205443 A1* | 8/2008 | Shi et al. | 370/468 |

OTHER PUBLICATIONS

Written Opinion of the International Searching Authority, PCT/SE2009/051357, Mar. 30, 2010.
International Search Report, PCT/SE2009/051357, Mar. 30, 2010.
International Preliminary Report on Patentability, PCT/SE2009/051357, Nov. 4, 2010.

* cited by examiner

METHODS AND DEVICES FOR WAVELENGTH ALIGNMENT IN WDM-PON

CROSS-REFERENCE TO RELATED APPLICATIONS

This application is a 35 U.S.C. §371 national stage application of PCT International Application No. PCT/SE2009/051357, filed on Nov. 30, 2009, which claims priority from U.S. Provisional Patent Application No. 61/118,873, filed on Dec. 1, 2008, the disclosures and contents of which are incorporated by reference herein in their entireties. The above-referenced PCT International Application was published in the English language as International Publication No. WO 2010/064981 on Jun. 10, 2010.

TECHNICAL FIELD

The invention relates to a wavelength division multiplexing passive optical network (WDM-PON), an optical network unit and methods for determining upstream optical wavelengths.

BACKGROUND ART

Today passive optical network (PON) systems exist where an optical line terminal (OLT), usually located at a providers premises, is connected by optical fiber to a number of optical network units (ONUs) usually located at a residential premises or business premises. To reduce costs these networks are often passive, hence called optical PON networks, which usually means that the routing devices between the OLT and the ONUs do not require any power or light sources. This reduces costs since optical sources in the form of transmitters are required only in each optical network unit (ONU) and in the optical line terminal at the providers premises.

In a simple arrangement, one wavelength is used for downstream signals, i.e. signals from the OLT to the ONUs, and time division multiplexing (TDM) is used to allocate a portion of the downstream signal to each ONU. A different wavelength may be used for upstream signals, i.e. signals from ONUs to the OLT. A simple passive splitter can then be used to send the correct portion of signal to each ONU.

In a refinement it is also known to use wavelength division multiplexing (WDM) where optical signals at more than one wavelength are sent out by the OLT, with each ONU being allocated one wavelength (although they could be allocated more than one). Each signal can then be modulated with information to be sent to an ONU. To route the correct wavelength signal to the correct ONU, a passive distribution node is provided which taps into the optical fiber at a location between the OLT and the ONUs. The function of the node, which often is referred to as a wavelength multiplexer (WMUX), is to combine upstream channels from different OLTs and to separate downstream channels to different OLTs. In this context "upstream" refers to data transmission from an ONU to an OLT while "downstream" refers to data transmission from an OLT to an ONU. As indicated, the upstream channels from different ONUs typically have different upstream wavelengths and are combined in the WMUX and is thereafter received by the OLT as an aggregated channel. The OLT can then separate the channels from each ONU by virtue of the different upstream wavelengths. In the downstream an aggregated channel from the OLT carries a downstream channel for each ONU, and the WMUX splits the aggregated channel into downstream channels that are received by a respective ONU via a respective optical communication line.

The WMUX is often of the arrayed waveguide grating (AWG) type, which is a known device for separating light (channels) of different wavelengths and to send them to the correct ONUs.

A wavelength division multiplexing passive optical network (WDM-PON) has in comparison with a time division multiplexing passive optical network (TDM-PON) several advantages, such as increased network capacity, dedicated bandwidth to each end-user (i.e. to each ONU), communication privacy and lower insertion loss of an WMUX compared to e.g. a power splitter in a TDM-PON, which in turn enables long reach. A WDM-PON has however a disadvantage in that each ONU much transmit signals (i.e. use a communication channel) to the OLT at a specific wavelength. Since it is usually not practical to implement a large number of different ONU-types, wavelength adaptive ONU-transmitters must often be used. This is typically referred to as "colorless" ONUs.

Tunable lasers as transmitters in an ONU are widely considered as the best long term solution for enabling upstream transmission at a correct wavelength. However, tuning of the transmitters must also be performed, both at a first the initialization of the transmitter as well as during operation of the transmitter.

Today solutions exist where a transmitter of an ONU is tuned for using a correct wavelength for an upstream optical signal.

KR2007059895, for example, discloses a WDM-PON and a wavelength initialization method that provide automatically array tunable light sources according to allocated unique wavelengths. This is achieved by installing WDM-PON master controllers and a WDM-PON slave controller in an OLT and an ONU respectively. The system and method are using a table configuration algorithm and an optimal value determination algorithm for performing an automatic wavelength initialization function.

US2007/0133986 discloses another technique for setting an upstream wavelength used for transmission from an optical network terminal acting as an ONU. Here, an OLT monitors an upstream optical wavelength and determines whether the wavelength is proper, to decide adjustment/maintenance and transmits a proper message as a result of the decision to the optical line terminal downwards.

The techniques described above are generally capable of adjusting an upstream wavelength used by an ONU for transmission to an OLT, but suffer from being relatively complex and/or an inability to satisfactory handle setting of upstream wavelengths for a larger number of ONUs. This is mainly due to the fact that the OLTs actively determines which upstream wavelength the ONU shall use, i.e. the OLT controls the ONU such that the ONU will set the correct upstream wavelength, which requires a rather complex structure of the OLT, in particular if a large number of ONUs are connected to the OLT.

SUMMARY

It is an object of the invention to at least partly overcome one or more of the above-identified limitations of the prior art. In particular, it is an object to provide setting of a proper upstream wavelength for an optical signal transmitted from an optical network unit to an optical line terminal, while reducing the work-load on the optical line terminal.

Hence an optical network unit for a passive optical network is provided, which optical network unit is configured to: initiate an upstream wavelength for an upstream signal from the optical network unit to an optical line terminal; iteratively, until an iteration criterion is met, i) transmit the upstream signal to the optical line terminal, ii) receive from the optical line terminal power level data for the upstream signal as measured by the optical line terminal, and iii) set the upstream wavelength for the upstream signal to a new wavelength-value; adjust the upstream wavelength to a wavelength-value previously set for the upstream signal and associated with power level data corresponding to a certain power level. The optical network unit may typically be configured to transmit user-data at the upstream wavelength.

The initiating of the upstream wavelength can be understood as setting the wavelength for the upstream signal. The iterative process in the apparatus may be seen as providing a wavelength-scanning functionality to the optical network unit, where a suitable wavelength can be determined after the scanning process is completed. The adjusting (i.e. setting) of the upstream wavelength to a previously set wavelength-value may represent setting the wavelength to a suitable value that renders a certain performance (signal power) as previously measured for the signal.

The optical network unit enables the use of simpler tunable lasers which can reduce the cost of transmitters in the optical network unit. Moreover, in comparison with some known solutions for setting a wavelength in an optical network unit, the present optical network unit does not require additional hardware in the optical distribution network. Also, the described optical network unit can rely on simple messages sent via a downstream signal and no messages need to be passed via upstream signals.

It should be noted that the optical network unit may, as will be described in detail below, comprise several different types of optical network units.

The iteration criterion may comprise the upstream wavelength being outside a certain wavelength-range. This is may be advantageous in that a suitable wavelength can be found relatively fast. The wavelength range may, for example, be defined by an output-port of a wavelength multiplexer, e.g. in the form of an arrayed waveguide.

The iteration criterion may comprise a received power level data fulfilling a certain condition. The certain condition can, for example, comprise the maximum power level or a power level that is determined sufficient for data communication at a certain rate.

The certain power level may comprise the largest power level of a set of received power level data.

The optical network unit may be configured to receive from the optical line terminal power level data for the upstream signal as measured by the optical line terminal. The power level data may be continuously received, which can typically include receiving the power level data prior, during and after sending any user-data associated with a user of the ONU. However, the power level data may just as well be received during transmission of user-data by the ONU. In this context, transmission of user data comprises the normal operation and service performed by the ONU, where various applications and user equipments such as computers can communicate via the ONU.

The optical network unit may be configured to, when the received power level data indicates a power level below a certain level, repeat the iteration and the adjusting of the upstream wavelength. In this case any transmission of user data may be interrupted when again performing the iteration (wavelength scanning), but in the typical case the transmission of user-data can be continued during the process, which is typically advantageous if the repeated iteration relates to fine-tuning the wavelength. The iteration may, for example, be performed again when the power level data indicates that the power level is 2%, 5% or 10% below the power level data that corresponded to the certain power level (typically the best power level measured).

During the repetition of the iteration, which can be seen as fine tuning of the wavelength, user-data may be continuously transmitted. In this case the user data is advantageously transmitted at the wavelength as currently tuned.

The optical network unit may be configured to, at specific time-intervals, repeat the iteration and the adjusting of the upstream wavelength. In this case any transmission of user data may be interrupted or continued as described above in connection with the repetition of the iteration. The iteration may, for example, be performed again after 2, 10, 60 or more minutes have passed since the previous iteration. Optionally or additionally, the iteration may be performed once every hour, day or week. In this case the repeated iteration can be seen as fine tuning, in a manner similar with the fine tuning described above.

The optical network unit may be configured to transmit the upstream signal via a wavelength multiplexer. In this case, the optical network unit may be configured to set the upstream wavelength within a passband-range of the wavelength multiplexer. More specifically the wavelength multiplexer may be athermal.

The optical network unit may be configured to receive from the optical line terminal a nominal wavelength value, and to set the upstream wavelength as a function of the nominal wavelength value. The nominal wavelength value can be a preferred wavelength value for the upstream signal, such as a passband wavelength (in the middle of a passband-range) of a port of a wavelength multiplexer, to which port the optical network unit is connected.

The optical network unit may be configured to set the upstream wavelength as a function of a set power level data associated with a respective upstream wavelength. For example, extrapolation on basis of set of previously received power data may be used in order to foresee the power level data for a certain wavelength value to be used, e.g. by standard extrapolation interpolation techniques, which makes it possible to reduce the number of iterations performed before the stopping criterion is met.

The optical network unit may be configured to receive a message indicative of a certain optical network unit of the passive optical network. Such a message typically comprises an identifier that may uniquely identify the certain network unit.

The optical network unit may be configured to receive a message indicative of a successful transmission of user data from the optical network unit to the optical line terminal. This is particularly suitable in case it is desirable to perform fine tuning, i.e. adjust to a new wavelength value but without scanning the full wavelength range but only a small range in the vicinity of a current wavelength.

According to another aspect of the invention an optical line terminal for a passive optical network is provided. The optical line terminal is configured to receive from an optical network unit an upstream signal comprising an upstream wavelength. The optical line terminal is also configured to: continuously i) receive the upstream signal from the optical network unit, ii) measure a power level of the received the upstream signal, and iii) transmit to the optical network unit power level data indicative of the measured power level. The optical line terminal may typically be configured to receive from the optical network unit user-data at an upstream wavelength of a previously received upstream signal and associated with power level data corresponding to a certain power level.

More specifically, the optical line terminal may be configured to receive the upstream signal from the optical network unit described above, which optical network unit may incorporate any of the associated features described above.

The optical line terminal may be configured to continuously transmit to the optical network unit power level data for the upstream signal as measured by the optical line terminal. Since the optical line terminal cooperates with the optical network unit, it may be configured to transmit the power level data both before, during and after transmission of user-data from the ONU. The power level data is here the same power level data as described for the optical network unit, and the continuous transmission can mean that the optical line terminal regularly or at certain time intervals transmits the power level data.

The optical line terminal may be configured to transmit to the optical network unit a nominal wavelength value for an upstream wavelength. Also, the optical line terminal may be configured to transmit a message indicative of a certain optical network unit of the passive optical network. As with the power level data, the nominal wavelength value and the message indicative of a certain optical network unit transmitted by the optical line terminal are same entities as received by the optical network unit.

The optical line terminal may also be configured to transmit a message indicative of a successful transmission of user data from the optical network unit to the optical line terminal.

According to another aspect of the invention a passive optical network system is provided and comprises at least one optical network unit and an optical line terminal. The passive optical network system is configured to: initiate an upstream wavelength for an upstream signal from the optical network unit to the optical line terminal; iteratively, until an iteration criterion is met, i) transmit the upstream signal from the optical network unit to the optical line terminal, ii) measure, at the optical line terminal, a power level of the received the upstream signal, iii) transmit from the optical line terminal to the optical network unit power level data indicative of the measured power level, and iv) set, at the optical network unit, the upstream wavelength for the upstream signal to a new wavelength-value; adjust, at the optical network unit, the upstream wavelength to a wavelength-value previously set for the upstream signal and associated with power level data corresponding to a certain power level. The passive optical network system may typically be configured to transmit user-data from the optical network unit to the optical line terminal at the upstream wavelength.

The optical network unit and optical line terminal of the system can each include functionality and features described above in association with the network unit respectively the line terminal.

According to another aspect of the invention, a method in an optical network unit, a method in an optical line terminal and a method in a passive optical network system are provided.

The inventive methods may include any of the functionality implemented by the features described above in association with the respective inventive optical network unit, optical line terminal and passive optical network system, and share the corresponding advantages.

According to still another aspect of the invention, a computer-readable medium is provided, which can store processing instructions that, when executed by a processor unit, performs any of the above described methods, including any variations thereof.

Still other objectives, features, aspects and advantages of the invention will appear from the following detailed description, from the attached claims as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
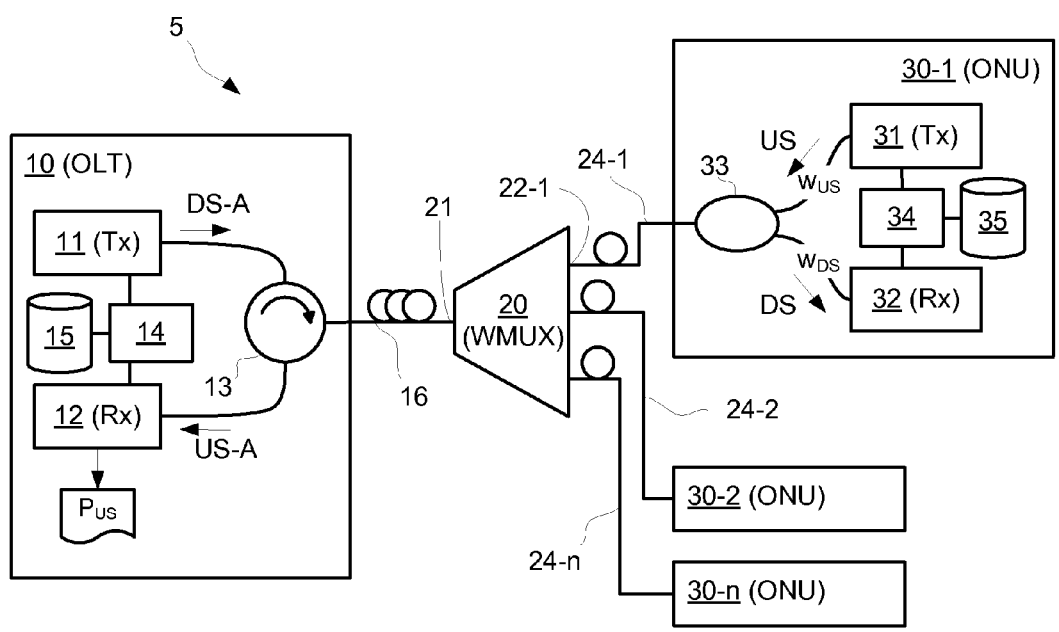
FIG. 1 illustrates en embodiment of a WDM-PON system implementing the invention, including the optical network unit and optical line terminal.

With reference to FIG. 1 a wavelength division multiplexing passive optical network (WDM-PON) system 5 is illustrated which relies on modulated downstream optical signals and a passive wavelength-division multiplexing splitter 20 in the form of an wavelength multiplexer (WMUX) that is able to perform multi-wavelength demodulation, such like an arrayed waveguide grating (AWG). The WMUX 20 functions simultaneously in the role of channel distributor and simultaneous demodulator for all channels directed over the WMUX 20. A bidirectional optical amplifier such as a saturated semiconductor optical amplifier (SOA) or erbium doped fiber amplifier (EDFA) (not shown) may be used for providing bidirectional amplification to compensate for possible losses.

The WDM-PON system 5 comprises an optical line terminal (OLT) 10 which typically is located at a provider premises. The OLT 10 performs the function of sending the downstream signals DS-A carrying data through an optical fiber 16 or other equivalent optical path. In this context, the term "optical fiber" is given a broad interpretation to cover groups of fibers, optical waveguides etc. The OLT 10 also performs the function of receiving upstream optical signals US from the fiber 16 and extracting data from the signals.

The optical fiber 16 is connected to an input port 21 of the WMUX 20 that splits the multiple wavelengths of a multiplexed signal DS-A from the OLT 10 such that one downstream optical signal DS with its corresponding wavelength $w_{DS}$ can be passed to a single output port 22-1. Thus, for n input wavelengths on a single fiber 16 from the OLT, the WMUX 20 will split the signal DS-A onto n output ports that are connected to a respective optical fiber 24-1, 24-2, 24-n.

As an example of an architecture for an WMUX 20, the WMUX may comprise a set of planar waveguides (not shown) of differing lengths fabricated on a silicon substrate. The input port 21 is as mentioned connected to the fiber 16 from the OLT 10, and is spaced from one end of the waveguides by a freespace region (not shown) so that incoming light diffracts at the interface between the input port 21 and the free space region. Each lightguide has a slightly different length and the optical waves coupled to each guide undergo a different phase change (dependent on the length of the lightguide). The other ends of the waveguides are arranged in a linear array at one side of a second free space region, and light diffracts from each waveguide across the second free space region to a set of waveguides which are respectively connected to one of the set of output ports (e.g. like the output port 22-1). Due to constructive interference between the light from each waveguide each output port will receive light of a different wavelength.

In brief, in the example shown, the WMUX 20 is realized by a custom narrow-band AWG which, for example, is a selected component with a Gaussian profile and a bandwidth on each channel of 0.6 times the channel spacing. It acts as WDM channel distributor to the ONTs.

Some or each optical fiber 24-1, 24-2 and 24-n extending from output ports of the WMUX 20 is connected to a respective optical network unit (ONU) 30-1, 30-2, 30-n, typically located at subscribers premises. By virtue of the WMUX 20, each of the ONTs 30-1, 30-2, 30-n can receive a downstream signal with a respective wavelength as spitted by the WMUX 20, such as the downstream signal DS received by the ONU 30-1 having the wavelength $w_{DS}$.

As known within the art, the WMUX 20 may also receive from the ONU 30-1 an upstream optical signal US transmitted with an upstream wavelength $w_{US}$, which together with other upstream signals from other ONTs 30-2, 30-n is multiplexed in the WMUX 20 for conveying the multiplexed upstream signal US-A to the OLT 10. Thus, two way communication can be established between the OLT 10 and the ONTs 30-1, 30-2, 30-n.

In further detail, the OLT 10 comprises a transmitter (Tx) 11 that transmits the multiplexed signal DS-A. For multiplexing the signal the transmitter 11 may comprise an AWG (not shown) similar to the one that may be used for the WMUX 20 for allowing a number of signals intended for different ONTs to be multiplexed. Included in the OLT 10 is also a receiver (Rx) 12 which may be one or more photodiodes in combination with a demultiplexer which may be an AWG (not shown) that demultiplexes an upstream signal US-A consisting several of upstream signals sent from ONTs like the ONTs 30-1, 30-2, 30-n. Thus, the receiver 12 can detect signals of a certain wavelength and measure a power level (energy of light) of the signal having the certain wavelength.

Instead of using an AWG for separating the signals from the different ONUs, a passive splitter can be used in which case the receiver 12 may comprise a tunable filter (e.g. a bandpass transmission filter) which during operation sweeps the wavelength range of any downstream signal sent via the WMUX 20 over the optical fiber 16. In any case, the OLT 10 can determine a number n of power level-values, where each power level indicates the power of the signal as received at the OLT10 from a respective ONU.

Included in the OLT 10 is a processor unit 14 and a data storage 15 from which the processor unit 14 may retrieve processing instructions that, when executed by the processor unit 14, performs a method in the OLT 10 in a manner further elucidated below.

The processor unit 14 can also generate power level data that indicates the power level for an upstream signal transmitted from a certain ONU and received by the receiver 12. More precisely, the power level data can include i) the power level as measured by the receiver 12, ii) the wavelength for which the power level was determined and iii) an identifier of the ONU that transmitted the signal for which the power level was determined. The power level data, which thus holds information about the measured power level, can then by the transmitter 11 be transmitted to specific ONU 30-1 for which the power level was measured.

Suitable data format and transmission method for communication between the OLT 10 and connected ONUs 30-1, 30-2 and 30-n can be found in known standards and protocols within the field of data communication.

A conventional optical diplexer filter or circulator 13 can be used to separate the upstream optical signal US-A travelling in opposite direction from the downstream optical signal DS-A in the optical fiber 16.

The above description of the OLT represents only one possible implementation, since several variants thereof may implemented while still using the methods described below. It is thus possible to e.g. combine the transmitter and receiver signals that correspond to a specific wavelength channel (and ONU) by a diplexer or a circulator, followed by a multiplexer (e.g. a cyclic AWG) which simultaneously multiplexes transmitter/receiver pairs onto the optical fiber 16.

The ONU 30-1, which is similar with the other illustrated ONUs 30-2, 30-n, comprises a receiver (Rx) 32 which receives the downstream signal DS demultiplexed by the WMUX 20 and a transmitter (Tx) 31 for sending the upstream signal US the be multiplexed by the WMUX 20. A 1×2 optical diplexer filter or coupler 33 connects the receiver 32 and transmitter 31 to the WMUX 20 via the optical fiber 24-1.

Included in the ONU 30-1 is a processor unit 34 and a data storage 35 from which the processor unit 34 may retrieve processing instructions that, when executed by the processor unit 34, performs a method in the ONU 30-1 in a manner further described below. The data storage 35 is typically a ROM, RAM or flash memory or any other memory suitable for storing data in a digital form. The processor unit is of any type capable of performing numeric control operations, such like processor units used is present ONU-units commonly available. Storing of data in the data storage 35 as well as performing communication between the processing unit 34, the data storage 35, the receiver 32 and the transmitter 31 are done according to known standards and protocols.

The receiver 32 and the processor unit 34 are in combination and as further elucidated below configured to receive the downstream signal DS having the downstream wavelength $w_{DS}$ (which wavelength $w_{DS}$ typically is determined by the WMUX 20). The transmitter 31 is configured to transmit the upstream signal US with a wavelength $w_{US}$ that is set in cooperation with the processor unit 34.

In brief, the receiver 32 in the ONU 30-1 receives the downstream signal with a wavelength $w_{DS}$ as filtered by the AWG in the WMUX 20. In the transmitter 31 a tunable filter (e.g. a bandpass reflection filter) acts as a cavity mirror of a laser output of the transmitter 31 for controlling the wavelength $w_{US}$ of the upstream transmitter. Alternative technologies may however be used for the tuning of the upstream wavelength $w_{US}$, such as tuning by means of e.g. electrical current or mechanical arrangements. Each of the filters in the receiver 32 and the transmitter 31 is controllable by the processor unit 34 such that signals of certain wavelengths can be both detected and transmitted.

The ONU may comprise different configurations depending on its application in the WDM PON system 5. For example, the ONU can be used in a Fiber-to-the-Building application in which case the ONU can have one PON-port connected to the PON network, followed by e.g. an Ethernet switch with several ports to e.g. individual residential subscribers. Other areas for which the ONU can be configured to be used includes Fiber-To-The-Node, Fiber-To-The-Curb, Fiber-To-The-Floor and Fiber-To-The-Business applications. Moreover, technologies such as ADSL, VDSL or other xDSL can be used as a connection between an end-terminal and the ONU. The ONU can also be adopted for use as backhauling in mobile networks or other technologies. For residential use, the ONU can be a data-only type of ONU, and may be arranged to support services such as voice, IPTV and video on demand.

Also, other schemes may be used to control the wavelength of the laser in the ONU, e.g. by implementing different arrangements of transmission and reflection filters as well as other adjustment sections. In principle, any method for controlling a transmission wavelength may be used for the described ONU.

Further variants of the WDM-PON system 5 can, in addition to the WMUX 20, include a passive power splitter commonly used in BPON (Broadband PON)/GPON (Gigabit PON)/EPON (Ethernet PON). Such a power splitter may be inserted before or after the WMUX. In this variant, several ONUs can be given same wavelength channel.

It can be said that the ONU 30-1 is colorless, since the upstream wavelength $w_{US}$ can be adjusted to the any of a number of wavelength channels (channels from a respective ONU) used in the WDM-PON system 5. The different distribution ports in the WMUX 20 determine which wavelength channel is used at a specific ONU. As implied, one way to realize a colorless ONU is to use a tunable laser for the upstream transmitter in the ONU. At the OLT 10, tunable lasers can be used (one for each wavelength port of the WMUX 20) or an integrated array of wavelength stabilized laser transmitters can be used. Alternatively, the techniques described above for controlling the wavelength of a transmission signal may be used, which may include injection techniques based on e.g. reflective SOAs.

As mentioned the WMUX 20 is usually implemented as an AWG. In addition to the function described above it can be of a cyclic type, where a ports like port 22-1 use different wavelengths. In such a case, it is possible to use separate wavelengths for the upstream and downstream, i.e. the WDM-PON system usually employ one group of wavelength channels for the downstream and another group is used for the upstream. These two groups are called "bands" and can be separated by a guard band of e.g. 15 nm. Typically the channel spacing within one band is 200 GHz, 100 GHz, 50 GHz or 25 GHz. For the case of an cyclic AWG, the channel spacing in different bands can be different due to material and design parameters and choices.

If the WMUX only has one wavelength for each port (acyclic), bidirectional transmission on the same wavelength can be used. Other variant may exist, e.g. a dual-fiber system using two WMUXs.

As indicated the transmitters at the ONU do not need to be stabilized to an absolute wavelength reference, but may instead be stabilized to the wavelengths of the different ports in the WMUX 20. For the system 5 it is possible to provide means to initialize the system to the correct wavelengths and monitor the alignment when the system is running. To this end a straight-forward protocol can be used to pass data from the OLT to the ONUs about the state of the upstream channel, which enables a less complex design of the transmitter at the ONU, thereby providing for design of low-cost applications.

In the WDM-PON system the transmitters at the ONU and the WMUX must not stabilized to an absolute wavelength reference, but may instead be stabilized to the passband wavelength of the corresponding output port (e.g. port 22-1) in the WMUX. The WMUX can be temperature stabilized (or athermal) or can have a wavelength drift with temperature. As will be described in detail below the WDM-PON system provides means for initializing the system to the correct wavelength and monitor the alignment when the system is running. If an absolute wavelength reference is used in the ONU, the system can also be used to initialize the wavelength of the ONUs.

Figure 2:
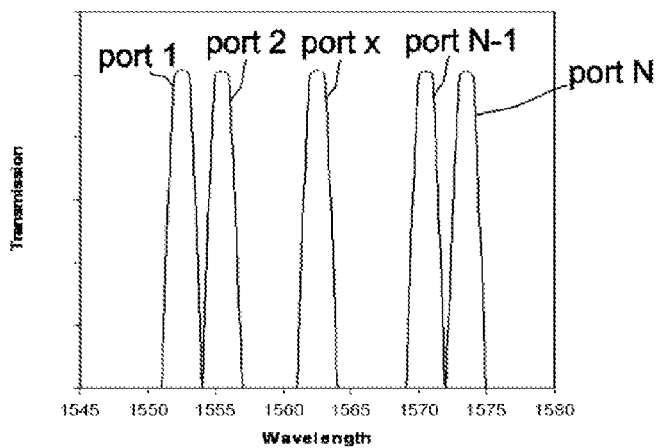
FIG. 2 is a diagram over filter characteristics for an optical wavelength multiplexer.
Figure 3:
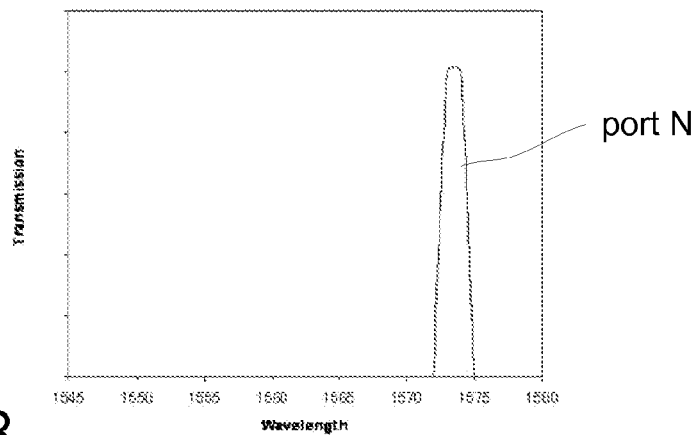
FIG. 3 is a diagram over filter characteristics for a single port of an optical wavelength multiplexer.

Schematically, the WMUX has a transmission for each output-port as illustrated in FIG. 2, which shows schematic filter characteristics for all ports of the wavelength multiplexer. When looking at e.g. port N, the transmission of the WMUX and the fiber infrastructure would have the transmission filter characteristics illustrated by FIG. 3, which shows schematic filter characteristics of one port in the WMUX.

In the WDM-PON system, downstream transmitters at the OLTs can be aligned to the correct wavelength channels. Therefore, it is possible to transmit information from the OLT to the ONU. The OLT may send messages to the ONU regarding the state of the upstream link. These messages can be sent in different ways, such as in the data channel or a control channel of the protocol used in the link, e.g. Ethernet, IP (Internet Protocol), or GPON (inband messages), as listed in the table below.

| Protocol | Message mechanism |
|---|---|
| Ethernet | OAM as defined in 802.3ah |
| Ethernet | CFM as defined in 802.1ag |
| Ethernet | Messages in Ethernet frames addressed to a specific pre-determined destination address, e.g. 00:00:00:00:00:00. |
| GPON | Downstream PLOAM messages, extended with one or more new message definitions. |
| IP | IP packets addressed to specific destination IP address, e.g. 0.0.0.0. |

Alternatively, the messages can use a different low-level channel coupled to the optical transmitter and receiver module (out-of-band messages), such as pilot tones or methods utilizing properties and/or modifications to the line codes commonly used. Examples of such line codes are 8B10B, 64B66B, 9B10B.

The ONU 30-1 will use these messages to autonomously control the upstream transmitter 31 to adapt its settings, e.g. power and wavelength $w_{US}$. In used scheme there must not be any messages passed in the upstream from the ONU to the OLT; only the upstream link state is used at the OLT.

In one embodiment, three message types can be sent to the ONU from the OLT, where each message has supplemental state information, where "p" is the power of the upstream signal as measured by the OLT, and "a" is a desired wavelength, i.e. a wavelength that is intended to be used for the upstream signal:

LINK_UP(p, a)
SIGNAL_DETECT(p, a)
NO_SIGNAL(a)

These are the basic messages but additional parameters may be transmitted to show e.g. the system channel spacing, ONU power requirements (or system power budget class), message delay, or channel bandwidth.

Depending on the implementation of the ONU, there different schemes to control the ONU wavelength may be used in order to obtain a proper alignment to the channel wavelength. Normally, there would be different states in the ONU depending on the status messages received from the OLT. Exactly what states and how many states is implementation dependent. The type of tunable laser and the tuning mechanism may also influence the needed number of states. Common tuning mechanism are based on temperature, currents, mechanical adjustment. These mechanisms adjust the filter which is used to determine the output wavelength of the laser.

If the tunable laser can accurately control the absolute wavelength, e.g. by using an internal wavelength reference, there could be at least two states in the ONU reception, such as i) at initialization, the transmitter is turned off, and ii) after the reception of message with the channel wavelength parameter a, it can be adjusted to the correct wavelength and turned on.

Figure 5:
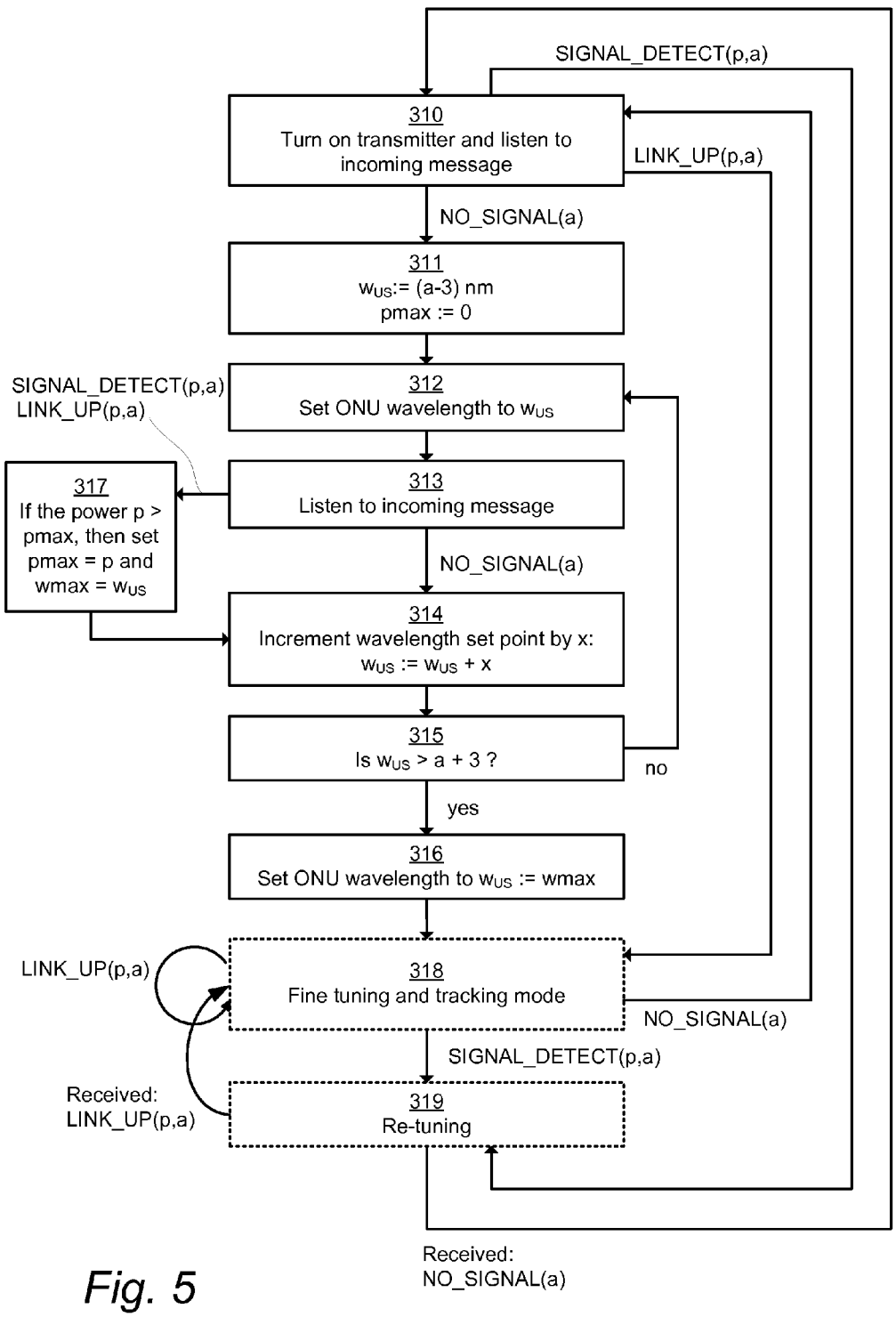
FIG. 5 is a flow diagram illustrating an embodiment of a method for determining an upstream wavelength, performed by the optical network unit of FIG. 1.

A different scheme may be used for a simpler ONU laser, where the wavelength can be adjusted to the vicinity of the channel wavelength, e.g. within ±3 nm. With reference to FIG. 5, a flow diagram of the initial adjustment for this case is illustrated in form of a number of steps 310-318. In FIG. 5, $w_{US}$ is the transmission wavelength of the ONU 30-1, i.e. corresponds to the upstream wavelength discussed in connection with the above described system 5. Also, as mentioned, "p" denotes the power level of the upstream signal as measured by the OLT 10, while "a" is used to denote the desired wavelength value.

In a first step 310, after the transmitter has been turned on, the ONU will listen to an incoming message. Upon reception of a NO_SIGNAL message (i.e. the OLT sends a message indicating that no signal within the relevant wavelength is received), the ONU would start a wavelength scan by adjusting the wavelength within the entire accuracy range. The desired wavelength is passed as a parameter in messages (i.e. in the NO_SIGNAL messages), here denoted "a".

In a next step 311 the scan is started at a wavelength w of (a−3) nm and completed at (a+3) nm in an iterative process. The iterative process includes the step 312 of setting a transmission wavelength of the ONU to the wavelength w. The ONU listens 313 to messages that comes from the OLT, and when SIGNAL_DETECT or LINK_UP messages are received the ONU would record 317 the optical power to determine the setting where the optical power is maximum. This includes setting a maximum power value pmax to the current power value p that was reported by the OLT, and setting the wavelength wmax to the wavelength value for which the pmax-value was determined.

In a next step 314 the wavelength value w is incremented according to a step size x. The incrementing is performed irrespectively if a signal was detected or not, and the parameter x is chosen to give sufficiently small step size to find the wavelength of maximum power at the OLT, e.g. x=0.05 nm or x=0.02 nm.

When the scan over the accuracy range is determined completed in a following step 315, the iteration the transmission wavelength w of the ONU is set, i.e. adjusted, to the wmax-value, which, accordingly, corresponds to the transmission wavelength for which the greatest power level pmax was measured and reported by the OLT, i.e. the wavelength setting wmax corresponding to the maximum power pmax is used.

The initial scan can use different step sizes, e.g. 0.05 nm, 0.02 nm or 0.01 nm. An ONU laser with a larger wavelength setting uncertainty may use a wider scan range, e.g. 6 nm or 10 nm. Schemes are also possible with a initial coarse scan to quicker find the approximate channel wavelength, followed by a fine tuning around the found approximate channel wavelength.

When the settings for correct wavelength have been determined, the ONU would be transmitting data. The ONU then enters a "fine tuning and tracking mode", by performing a step 318 of fine tuning and tracking. The OLT will then send LINK_UP messages as long as the data transmission is established in the uplink. In this state, the ONU can fine-tune the wavelength based on the optical power data in the LINK_UP message. This is useful to accommodate wavelength drift cause by e.g. change in temperature, ageing, supply voltages etc. This mode is indicated in FIG. 5, but no described in detail. However, in brief this step 318 could slowly dither the wavelength around the current setting to track the local maximum of the power, and can be performed in a similar way as for the first tuning earlier described, but with a smaller setpoint value x. Determining whether data (user data) transmission is successfully performed may be achieved by implementing common communication verification methods within the field of data communication.

In a following step 319 it is possible to re-tune the upstream wavelength, and for this purpose continuous SIGNAL_DETECT message is sent to the ONU from the OLT, and when the power level can be found to decrease to a certain extent, the re-tuning operation may be initiated. Alternatively, the re-tuning is regularly performed, either continuously during operation or at regular time intervals.

It is possible that the data transmission is interrupted due to different reasons. If a SIGNAL_DETECT message is received, the data transmission has a problem for some reason, but the OLT can still see optical power from the ONU. In this case, the re-tuning around the current wavelength setting is possible. If, on the other hand, a NO_SIGNAL message is received, the OLT does not see any optical power coming from the ONU and a complete initial wavelength adjustment is performed.

In the implementation the scheme of FIG. 5, the delay of a message may be taken into account when listening to incoming messages. The roundtrip delay of 50 km fiber is 0.5 ms, which would be the minimum time for a change at the ONU to be detected at the OLT and reported back to the ONU. Processing delay may thus be added, which can be implemented by using dedicated standard techniques.

Figure 4:
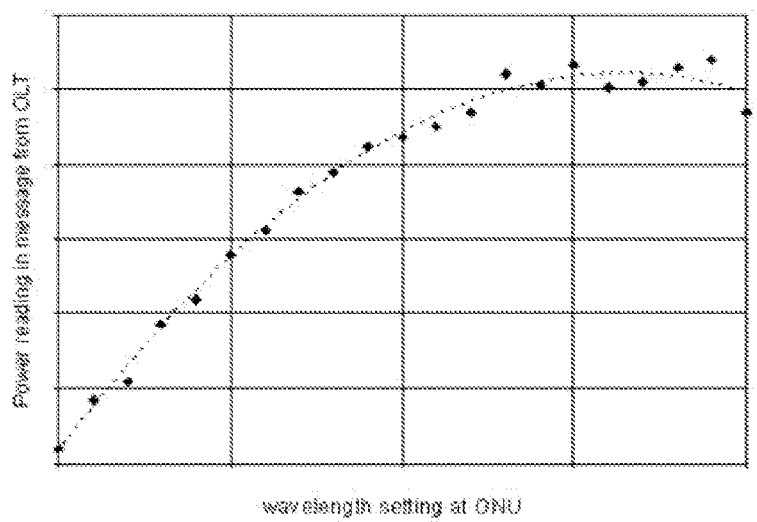
FIG. 4 is a diagram over a number of wavelength settings in the optical network unit of FIG. 1.

The method described above for maximum search may include curve fitting to the recorded data points, as illustrated in FIG. 4, which is a schematic example of wavelength settings in the ONU and associated power readings from the OLT, during an initial scan (wavelength setting/adjustment). The measurement noise present shows that the determination of the correct wavelength setting can be improved by using curve fitting to the recorded data. If the ONU could set the wavelength accurately, the curve would be centered. In the illustrated example the wavelength emitted by the ONU is lower than the wavelength setting, resulting in a right-shifted curve.

The measurement noise present in FIG. 4 shows that curve fitting can improve the determination of the correct wavelength setting. There can also be irregularities in the filter shape of the AWG which can give irregular curves like the one in FIG. 4.

It is also possible to extrapolate a next wavelength setting such that a best power reading may be achieved faster. In this context, it can hence be said that the upstream wavelength can be set as a function of a set power level data associated with previously used respective upstream wavelengths. Any suitable known method within the field of extrapolation may be used for this purpose.

Due to the scanning and fine-tuning of wavelength some additional power loss could be introduced, and in combination with the noise present on any link, some additional power can be used as needed in a link budget setup for the system. This would allow stable operation even during fine-tuning of the ONU wavelength which would move the ONU wavelength slightly away from the maximum power. More precisely, an additional power of 0.5 dB of 1 dB may be sufficient in the link budget.

The method may be used for a point-to-point data transmission protocol, e.g. 1 Gb Ethernet or 10 Gb Ethernet. However, the method can be extended to use protocols used in time-division multiplexed PONs like GPON and EPON. In these schemes, there are several ONUs attached to each distribution fiber which have to be aligned to the same wavelength channel. In that case, the messages from the OLT may contain information regarding which ONU the message refers to. Note that this can be implicitly included in the used protocol, or sent explicitly in the messages. For GPON, the downstream PLOAM (Physical Layer Operations, Administration and Maintenance) messages can be used for this purpose. In this case initialization of the different ONUs may be performed. One way to accomplish this is through a modified ranging procedure where the messages of this invention is passed along with other ranging and start-up information.

Figure 6:
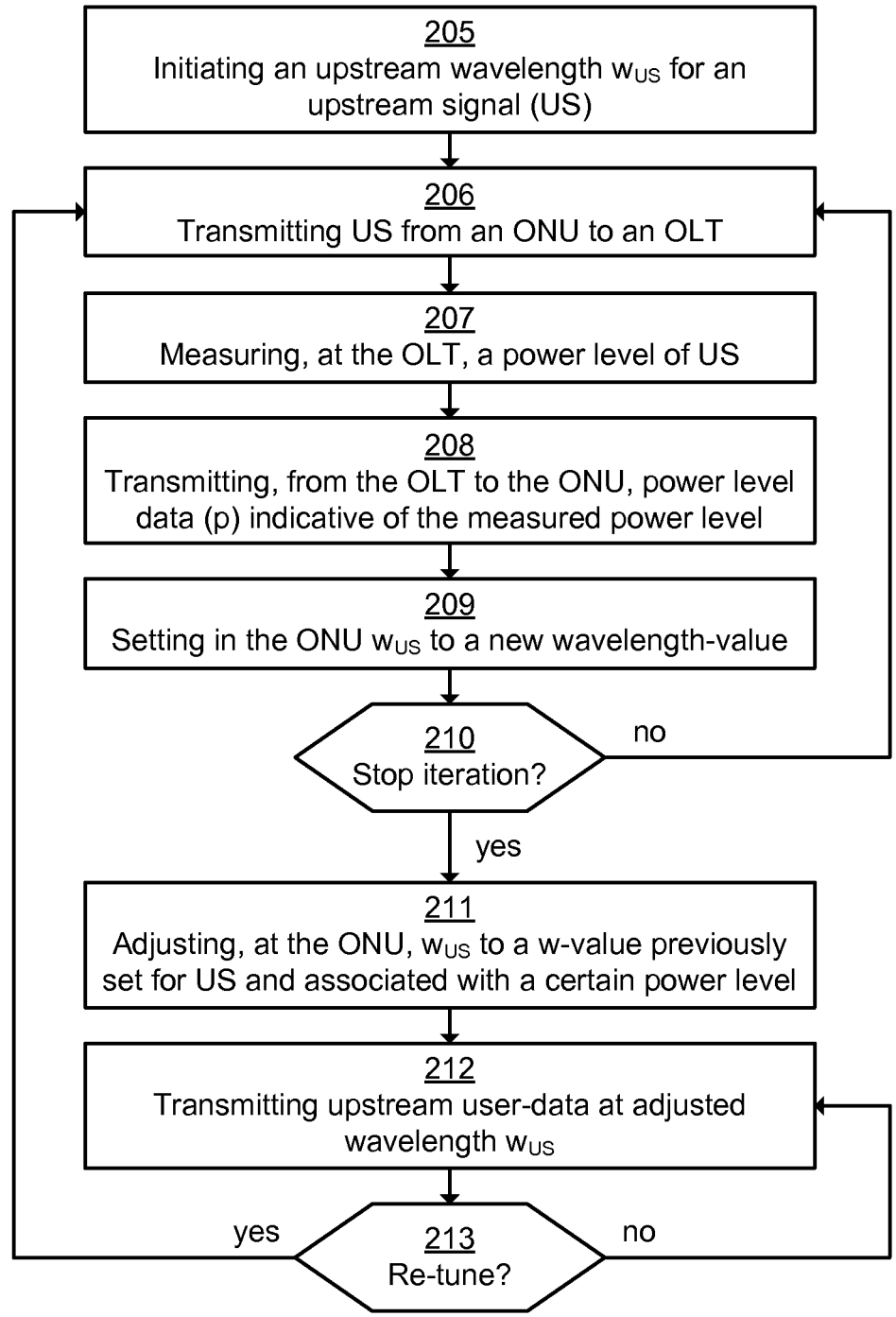
FIG. 6 is a version of a flow diagram illustrating the method of FIG. 5, as performed by the system of FIG. 1.

For illustrating the method of FIG. 5 in another form, but with same features, reference is made to FIG. 6. In this figure, the WDM-PON system 5 as a whole performs a number of steps 205-213 for tuning (i.e. determining, setting or adjusting) the upstream optical wavelength $w_{US}$ used by the transmitter 31 in the ONU.

Here, in the first step 205, the upstream wavelength $w_{US}$ is initiated. Typically this includes setting the wavelength $w_{US}$ to a value that is dedicated for the specific ONU, and can be communicated to the ONU via a downstream signal from the OLT. Optionally or alternatively, the upstream wavelength $w_{US}$ can be initiated by setting it to a value previously stored in the ONU 30-1. The exact value of the initial wavelength value depends on which wavelength the system allocates the ONU, and is determined in a manner according to known standards and protocols.

In a next step 206 the ONU 30-1 transmits an upstream signal US at the upstream wavelength $w_{US}$ to the OLT 10.

In the following step 207 the OLT 10 measures a power level of the received the upstream signal US and generates a message that holds the power level data p that indicates the measured power level.

In the next step 208 the OLT 10 transmits to the optical network unit 30-1 the power level data p, and in a following step 209 the ONU sets the upstream wavelength $w_{US}$ for the upstream signal US to a new wavelength-value. The new wavelength is typically an based on the previous wavelength, for example by adding or subtracting a wavelength step size to/from the previous wavelength. When the power level data p is received by the ONU 30-1, the processor unit 34 and the memory unit 35 stores the power level data p and its associated wavelength value $w_{US}$. Optionally or alternatively, the ONU determines if the power level data indicates a so far best power level, and, if this is the case, stores the data as the maximum power level together with its associated wavelength value, which is referred to as "best wavelength".

The steps 206-209 are performed in an iterative manner until a stopping criterion can be determined 210. Typically this includes the upstream wavelength being out of a certain wavelength range. Also, the iteration can be stopped if the maximum power level is above a predefined level, or if it can be determined that the power level has passed a maximum peak.

After the iteration, in the next step 211 the ONU sets the upstream wavelength to the "best wavelength", i.e. to the wavelength associated with the maximum power level.

In the next step 212 upstream user data is transmitted from the ONU to the OLT, which, accordingly is done at the "best wavelength". Of course, it is possible that upstream user data is transmitted during previous steps of the method, as the only requirement for this process per se is establishment of a wavelength that allows at least upstream data transmission.

Finally step 213 for retuning the upstream wavelength is entered, which can include entering step 206 at regular time intervals, such as every 5 seconds, every 10:th minute, every 2 hours etc.

Figure 7:
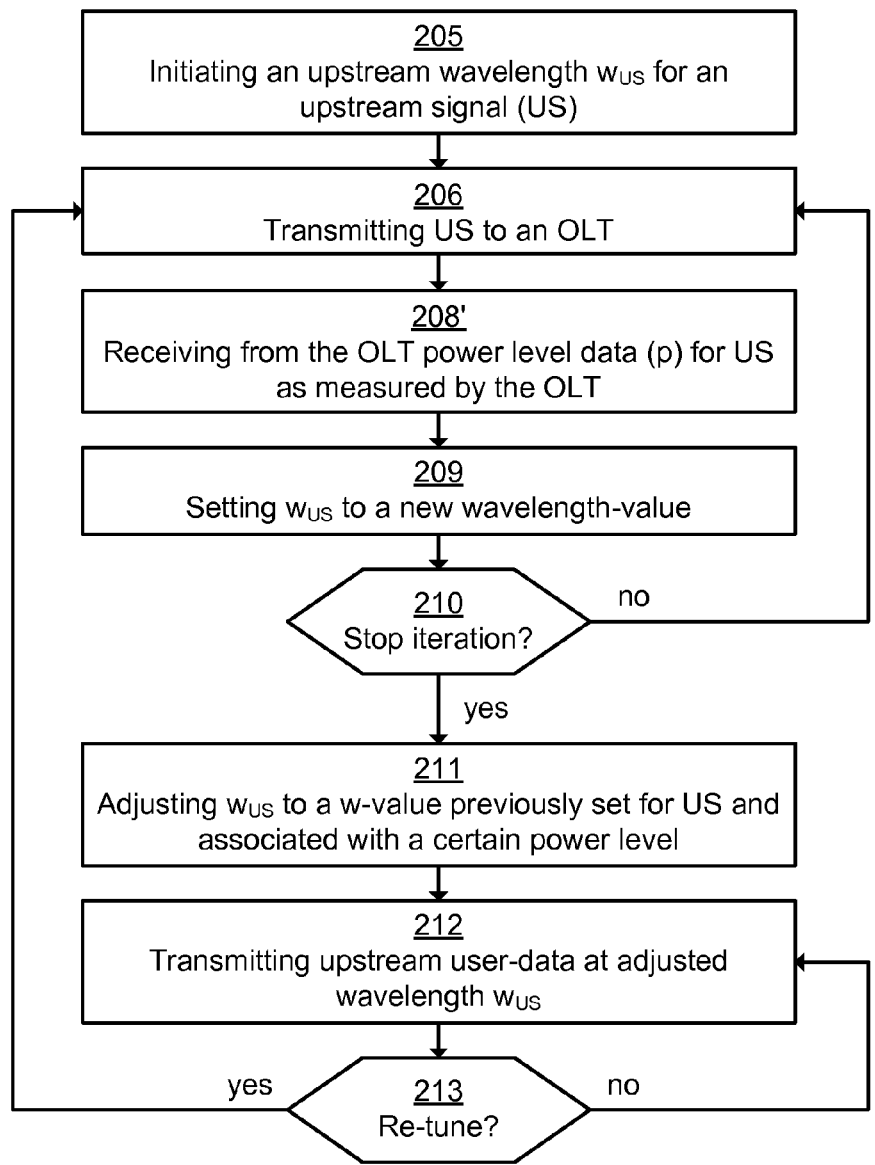
FIG. 7 is a version of a flow diagram illustrating the method of FIG. 5, as performed by the optical network unit of FIG. 1.

With reference to FIG. 7 the above described wavelength adjusting method as performed in the ONU 30-1 is illustrated in another graphical form. In comparison with the method described for the WDM-PON system 2 as a whole, the method in the ONU 30-1 differs in that step 207 is excluded as it is performed in the OLT 10. Also, the step 208 of FIG. 6 is replaced by the step 208', since the ONU 30-1 receives the power level data p from the OLT 10.

This means that the necessary involvement of the OLT 10 can be limited to the measurement of the power level of the upstream signal from the ONU 30-1. However, if the ONU requires an initial wavelength value for the upstream wavelength $w_{US}$ in step 205, the OLT 10 may be involved by sending the initial value.

Figure 8:
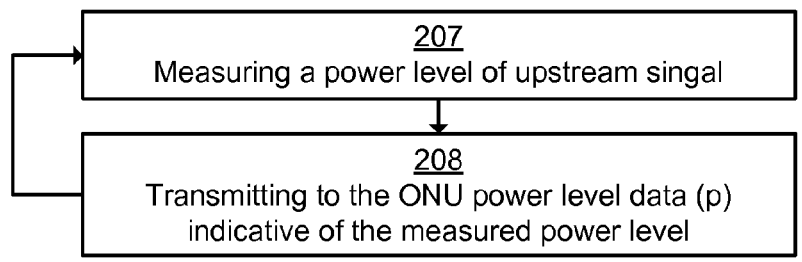
FIG. 8 is a version of a flow diagram illustrating the method of FIG. 5, as performed by the optical line terminal of FIG. 1.

With reference to FIG. 8 the above described wavelength adjusting method as performed in the OLT 10 is illustrated. As the OLT 10 has a passive role, fewer steps are required, where, in a first step 207, the OLT measures a power level of a received upstream signal having a wavelength (or being within a wavelength range) dedicated for a certain ONU, such as the ONU 30-1. In the next step 208 the OLT 10 transmits to the ONU 30-1 power level data that indicates the measure power level, which includes an indication that the power level is zero, i.e. that no signal has been received from the ONU 30-1. Thus, if no signal is received from the ONU 30-1 connected to the OLT 10 the OLT 10 continuously or regularly sends a NO_SIGNAL message.

Software instructions, i.e. a computer program code for carrying out embodiments of the described method as performed by the system 5, the ONU 30-1 and the OLT 10 may for development convenience be written in a high-level programming language such as Java, C, and/or C++ but also in other programming languages, such as, but not limited to, interpreted languages. The software instructions can also be written in assembly language or even micro-code to enhance performance and/or memory usage. It will be further appreciated that the functionality of any or all of the functional steps performed may also be implemented using discrete hardware components, one or more application specific integrated circuits, or a programmed digital signal processor or microcontroller. Accordingly, the computer-readable mediums 15, 35 can store processing (software) instructions that, when executed by e.g. the relevant processor unit 14, 34, performs the method implemented in the system 5, the ONU 30-1 and the OLT 10. Also, operations may be performed in a different order than described, may be combined and may be divided into sub-operations.

In practice, the invention may be implemented in e.g. already existing WDM-PON systems, i.e. can be implemented in existing optical network units and optical line terminals without requiring any modification of hardware components.

Although various embodiments of the invention have been described and shown, the invention is not restricted thereto, but may also be embodied in other ways within the scope of the subject-matter defined by the above described devices and methods.

The invention claimed is:

1. An optical network unit of a passive optical network, wherein the optical network unit is configured to:
set an initial value of an upstream wavelength ($w_{US}$) for an upstream signal (US) from the optical network unit to an optical line terminal,
iteratively perform the following until an iteration criterion is met:
i) transmit the upstream signal (US) to the optical line terminal,
ii) receive from the optical line terminal power level data (p) for the upstream signal (US) as measured by the optical line terminal, and
iii) set the upstream wavelength ($w_{US}$) for the upstream signal (US) to a wavelength-value as a function of a set of power level data associated with a respective upstream wavelength; and
select, autonomous from the optical line terminal, the upstream wavelength ($w_{US}$) to one of the wavelength-values previously set during the iteratively performing and associated with one of the set of power level data corresponding to a certain power level.

2. An optical network unit according to claim 1, wherein the iteration criterion comprises the upstream wavelength ($w_{US}$) being outside a certain wavelength-range.

3. An optical network unit according to claim 1, wherein the iteration criterion comprises the received power level data (p) fulfilling a certain condition.

4. An optical network unit according to claim 1, wherein the certain power level comprises a largest power level of the set of power level data.

5. An optical network unit according to claim 1, wherein the optical network unit is configured to, when the received power level data (p) indicates a power level below a certain level, repeat the iteratively performing and the adjusting of the upstream wavelength.

6. An optical network unit according to claim 1, wherein the optical network unit is configured to, at specific time-intervals, repeat the iteratively performing and the adjusting of the upstream wavelength.

7. An optical network unit according to claim 1, wherein the optical network unit is configured to transmit the upstream signal (US) via a wavelength multiplexer.

8. An optical network unit according to claim 7, wherein the optical network unit is configured to set the upstream wavelength ($w_{US}$) within a passband-range of the wavelength multiplexer.

9. An optical network unit according to claim 1, wherein the optical network unit is configured to receive from the optical line terminal a nominal wavelength value (a), and to set the upstream wavelength ($w_{US}$) as a function of the nominal wavelength value.

10. An optical network unit according to claim 1, wherein the optical network unit is configured to receive a message indicative of one of a plurality of optical network units of the passive optical network.

11. An optical network unit according to claim 1, wherein the optical network unit is configured to receive a message indicative of a successful transmission of user data from the optical network unit to the optical line terminal.

12. An optical line terminal of the passive optical network of claim 1, wherein the optical line terminal is configured to receive from the optical network unit of claim 1 an upstream signal (US) comprising an upstream wavelength ($w_{US}$), the optical line terminal further configured to continuously:
i) receive the upstream signal (US) from the optical network unit,
ii) measure a power level of the received the upstream signal (US), and
iii) transmit to the optical network unit the power level data (p) indicative of the measured power level.

13. An optical line terminal according to claim 12, wherein the optical line terminal is configured to transmit to the optical network unit a nominal wavelength value (a) for the upstream wavelength ($W_{US}$).

14. An optical line terminal according to claim 12, wherein the optical line terminal is configured to transmit a message indicative of one of a plurality of optical network units of the passive optical network.

15. An optical line terminal according to claim 12, wherein the optical line terminal is configured to transmit a message indicative of a successful transmission of user data from the optical network unit to the optical line terminal.

16. A passive optical network system comprising at least one optical network unit and an optical line terminal, the system configured to:
set an initial value of an upstream wavelength ($w_{US}$) for an upstream signal (US) from the optical network unit to the optical line terminal,
iteratively perform the following until an iteration criterion is met:
i) transmit the upstream signal (US) from the optical network unit to the optical line terminal,
ii) measure, at the optical line terminal, a power level of the received upstream signal (US),
iii) transmit from the optical line terminal to the optical network unit power level data (p) indicative of the measured power level, and
iv) set, at the optical network unit, the upstream wavelength ($w_{US}$) for the upstream signal (US) to a wavelength-value, and as a function of a set of power level data associated with a respective upstream wavelength; and
select, at the optical network unit, autonomous from the optical line terminal, the upstream wavelength ($w_{US}$) to one of the wavelength-values previously set during the iteratively performing and associated with one of the set of power level data corresponding to a certain power level.

17. A method in an optical network unit of a passive optical network, the method comprising:
setting an initial value of an upstream wavelength ($w_{US}$) for an upstream signal (US) from the optical network unit to an optical line terminal,
iteratively performing the following until an iteration criterion is met:
i) transmitting the upstream signal (US) to the optical line terminal,
ii) receiving from the optical line terminal power level data (p) for the upstream signal (US) as measured by the optical line terminal, and
iii) setting the upstream wavelength ($w_{US}$) to a wavelength-value, and as a function of a set of power level data associated with a respective upstream wavelength; and
selecting, autonomous from the optical line terminal, the upstream wavelength ($w_{US}$) to one of the wavelength-values previously set during the iteratively performing and associated with one of the set of power level data corresponding to a certain power level.

18. A method in the optical line terminal of the passive optical network of claim 17, the method comprising:

receiving, from the optical network unit of claim 19, the upstream signal (US) having an upstream wavelength ($W_{US}$), the method further comprising:
  i) continuously receiving the upstream signal (US) from the optical network unit,
  ii) continuously measuring a power level of the received the upstream signal (US), and
  iii) continuously transmitting to the optical network unit power level data (p) indicative of the measured power level.

19. A method in a passive optical network system comprising at least one optical network unit and an optical line terminal, the method comprising:
  setting an initial value of an upstream wavelength ($w_{US}$) for an upstream signal (US) from the optical network unit to the optical line terminal,
  iteratively performing the following until an iteration criterion is met:
    i) transmitting the upstream signal (US) from the optical network unit to the optical line terminal,
    ii) measuring, at the optical line terminal, a power level of the received the upstream signal (US),
    iii) transmitting from the optical line terminal to the optical network unit power level data (p) indicative of the measured power level, and
    iv) setting, at the optical network unit, the upstream wavelength ($w_{US}$) for the upstream signal (US) to a wavelength-value, and as a function of a set of power level data associated with a respective upstream wavelength; and
  selecting, at the optical network unit, autonomous from the optical line terminal, the upstream wavelength to be one of the wavelength-values previously set during the iteratively performing and associated with one of the set of power level data corresponding to a certain power level.

20. A non-transitory computer-readable medium storing processing instructions that, when executed by a processor unit, performs the method according to claim 19.

21. An optical network unit according to claim 5, wherein the optical network unit is configured to continue transmission of user data to the optical line terminal during repetition of the iteratively performing and the adjusting.

* * * * *

UNITED STATES PATENT AND TRADEMARK OFFICE
CERTIFICATE OF CORRECTION

Page 1 of 2

PATENT NO. : 8,649,681 B2
APPLICATION NO. : 13/129741
DATED : February 11, 2014
INVENTOR(S) : Ohlen It is certified that error appears in the above-identified patent and that said Letters Patent is hereby corrected as shown below:

On the Title Page, Item (73), under "Assignee", in Column 1, Line 2, delete "(Publ) (SE)" and insert -- (Publ), Stockholm (SE) --, therefor.

On the Title Page, Item (74), under "Attorney, Agent, or Firm", in Column 2, Line 2, delete "Sajvoec," and insert -- Sajovec, --, therefor.

On the Title Page, Item (57), under "ABSTRACT", in Column 2, Line 2, delete "($w_{us}$)" and insert -- ($w_{US}$) --, therefor.

On the Title Page, Item (57), under "ABSTRACT", in Column 2, Line 9, delete "($w_{us}$)" and insert -- ($w_{US}$) --. therefor.

On the Title Page, Item (57), under "ABSTRACT", in Column 2, Line 11, delete "($w_{us}$)" and insert -- ($w_{US}$) --, therefor.

In the Drawings

In Fig. 8, Sheet 5 of 5, in Box "207", in Line 1, delete "singal" and insert -- signal --, therefor.

In the Specification

In Column 7, Line 18, delete "ONTs." and insert -- ONUs. --, therefor.

In Column 7, Line 23, delete "ONTs" and insert -- ONUs --, therefor.

In Column 7, Line 30, delete "ONTs" and insert -- ONUs --, therefor.

Signed and Sealed this
Fifteenth Day of July, 2014

Michelle K. Lee
*Deputy Director of the United States Patent and Trademark Office*

In Column 7, Line 34, delete "ONTs" and insert -- ONUs --, therefor.

In Column 7, Line 39, delete "ONTs" and insert -- ONUs --, therefor.

In Column 7, Line 44, delete "ONTs like the ONTs" and insert -- ONUs like the ONUs --, therefor.

In Column 14, Line 36, delete "the OLT 10 the OLT 10" and insert -- the OLT 10, the OLT 10 --, therefor.

In the Claims

In Column 16, Line 8, in Claim 13, delete "($W_{US}$)." and insert -- ($w_{US}$). --, therefor.

In Column 17, Line 3, in Claim 18, delete "($W_{US}$)," and insert -- ($w_{US}$), --, therefor.